Patented Aug. 14, 1945

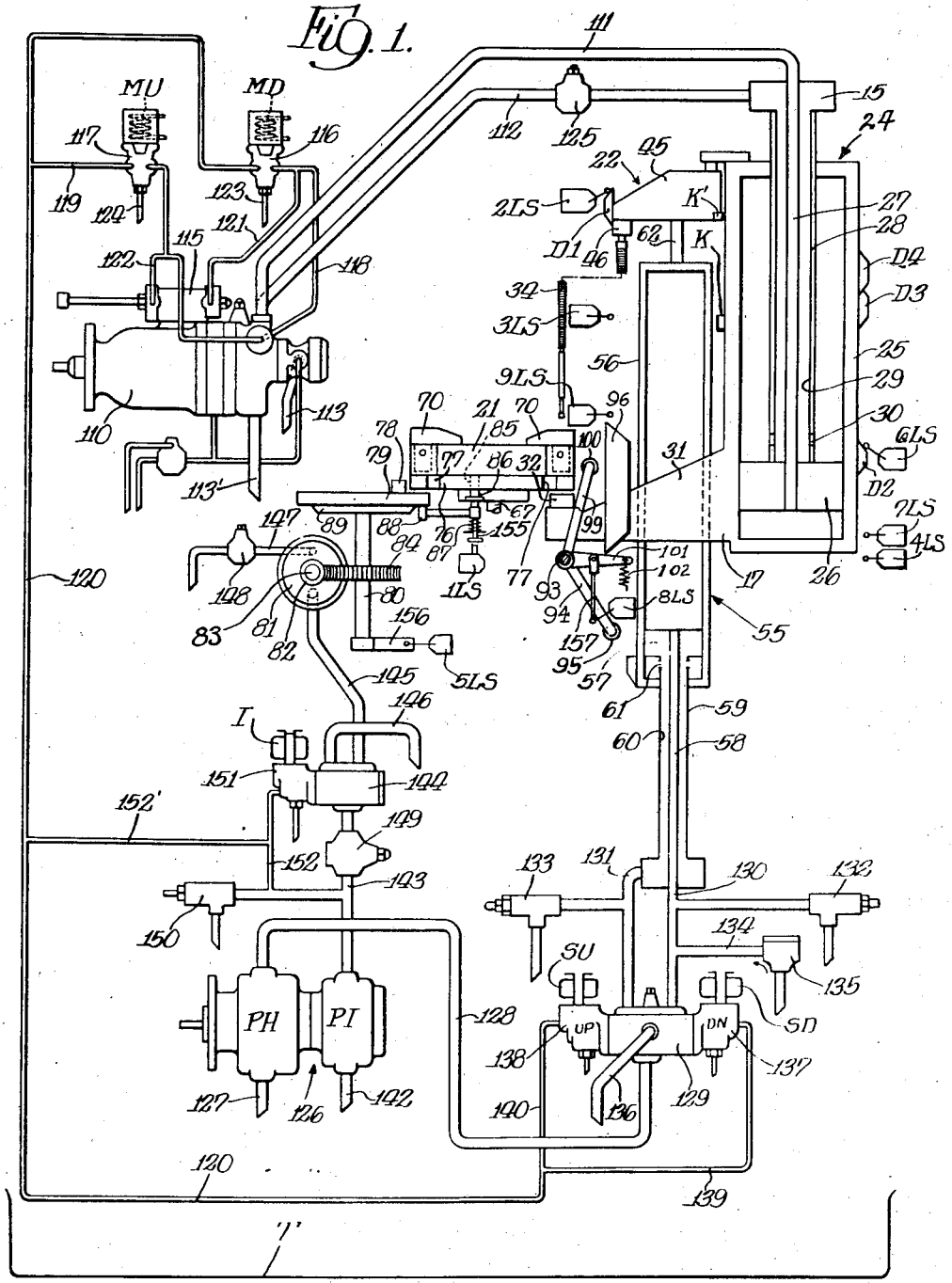

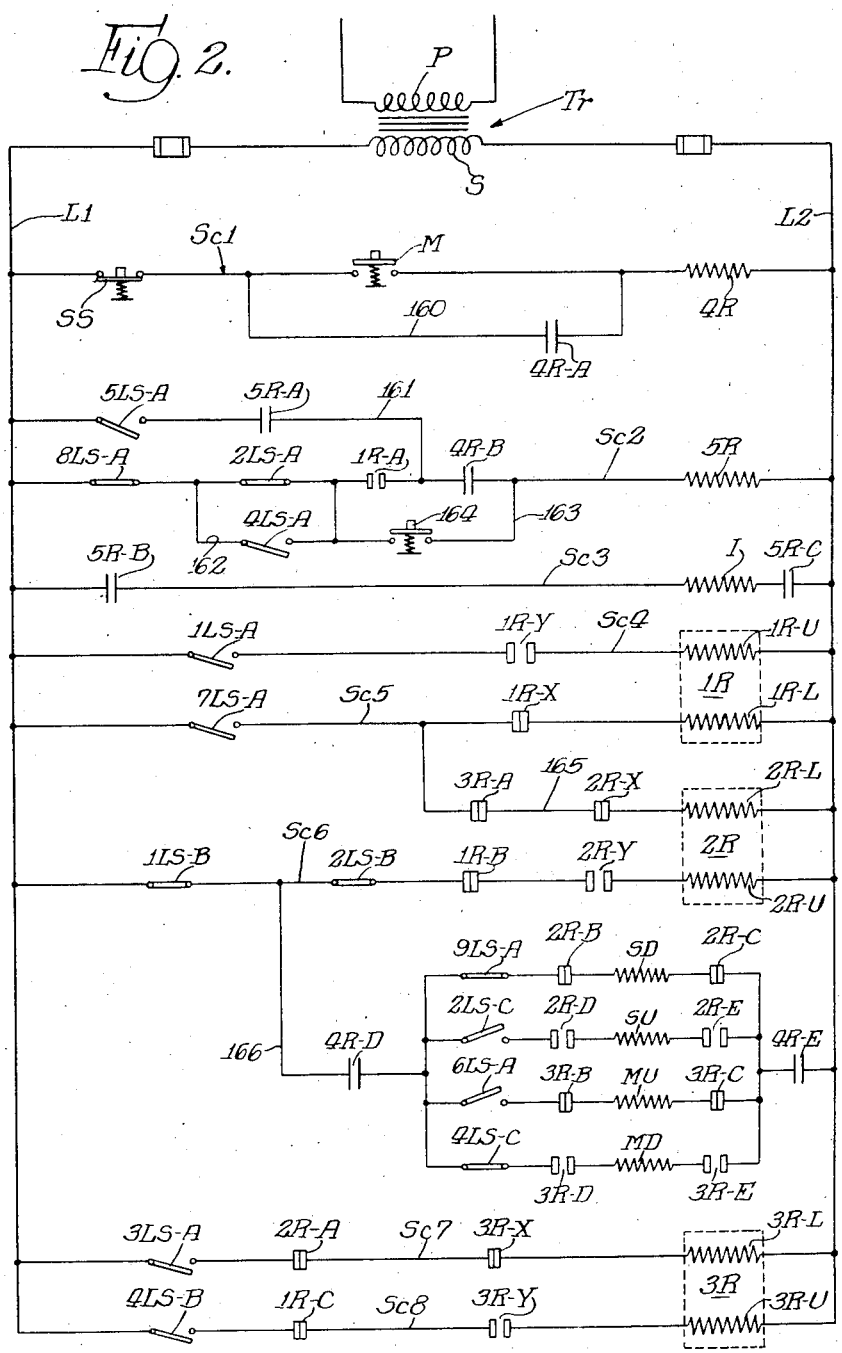

2,382,023

UNITED STATES PATENT OFFICE 2,382,023

POWER TRANSMISSION SYSTEM

John W. Podesta, Ann Arbor, Mich., assignor to American Broach & Machine Co., Ann Arbor, Mich., a corporation of Michigan Original application August 2, 1940, Serial No. 349,430, now Patent No. 2,343,420, dated March 7, 1944. Divided and this application October 24, 1941, Serial No. 416,315

15 Claims. (Cl. 60—97)

The invention relates generally to power transmission systems and more particularly to fluid, especially hydraulic, transmission systems.

One object of the invention is to provide a new and improved transmission system for operating a plurality of motors in a predetermined sequence.

Another object is to provide a new and improved transmission system particularly adapted for use with a broaching machine and including a first hydraulic motor for actuating a main broach slide, a second hydraulic motor for actuating a broach handling mechanism, a third hydraulic motor for indexing a work support, and means causing operation of the motors in a predetermined sequence.

Yet another object is to provide a transmission system having a main and an auxiliary motor, a plurality of pumps supplying fluid to the motors, and means for permitting fluid to be drawn into the auxiliary motor directly from the supply source and without going through the pump when the auxiliary motor is driven by the main motor.

Other objects and advantages will become apparent from the following detailed description taken in connection with the accompanying drawings, in which:

Fig. 1 is a diagrammatic view particularly showing the hydraulic circuit of a power transmission system embodying the features of this invention.

Fig. 2 is a diagrammatic view of the electrical control circuit for the power transmission system.

This application is a division of my pending application Serial No. 349,430, filed August 2, 1940, issued March 7, 1944 as Patent No. 2,343,420, for Broaching machines. While the power transmission system herein claimed is readily applicable to a variety of machines and uses, it is particularly applicable to a broaching machine as disclosed in my above mentioned copending application. Accordingly, the power transmission system will, for purposes of disclosure, herein also be described as adapted for a broaching machine, but it is not intended that the invention is to be limited thereby. On the contrary, it is intended to cover all modifications, alternative constructions, and adaptations falling within the spirit and scope of the invention as defined in the appended claims.

The power transmission system comprises generally a main hydraulic motor 24, an auxiliary hydraulic motor 55, and a third hydraulic motor 81. Fluid is supplied to these motors by pump means 110, PH and PI, respectively, the fluid supplied being under the control of suitable valve means. These valve means in turn are under the control of an electrical governing system.

Such a power transmission system is readily adaptable to a broaching machine, for example, to one of the internal, pull down type disclosed in my above mentioned application. Such a machine has an upright column on which is vertically reciprocable a main broach actuating slide 17. Disposed in front of the column about midway thereof is a work supporting means including a rotary, indexable work supporting table 21. The table is loaded by an operator standing in front of the machine and is operable to carry the work from the loading position first to a broaching position, where it is acted upon by the broaching tool, and thereafter carries the work to a discharge position where the work is automatically unloaded. Such a machine also has broach handling mechanism, generally designated 22, which functions to support the broaching tool above the work support during the presentation of a new work blank and to initiate passage of the tool through the work blank.

In the adaptation of the power transmission system to such a machine, the main motor 24 actuates the main slide 17, the auxiliary motor 55 actuates the broach handling mechanism, and the third motor is utilized to index the work table 21. The control means of the system renders it, and hence the machine, automatic in operation. More particularly the system drives the machine in the following manner: The machine is initially started and finally stopped manually by the operator, all other cycles of operation automatically repeating. In a cycle of operation, the broach handling mechanism first moves downwardly to pass the broaching tool through the work and into engagement with the main broach actuating slide, whereupon the main slide moves downwardly to pull the broach through the work. During the broaching operation, the operator loads a new work piece onto the table 21 and, upon completion of the broaching operation and while the main slide remains down, the table 21 is automatically indexed through 90° to carry the finished work piece to discharge position and also to free the path permitting the broaching tool to be returned to normal position supported by the broach handling means 22. Completion of the indexing of the table 21 initiates the return movement of the main slide and as an incident to such movement the finished work piece is discharged. Upon return of the broaching tool to normal position, the table 21 is again indexed, thereby presenting new work pieces to broaching position and the machine is ready for the cycle to be repeated.

The hydraulic motor 24 is of the reciprocatory type comprising a cylinder 25 and piston 26 (see Fig. 1). Inasmuch as this motor drives the main slide 17, as above stated, the motor is herein shown with the cylinder 25 formed integrally with the slide 17, while the piston 26 is stationary, having its rod rigidly anchored in means 15 constituting a part of the top of the upright column. The piston rod comprises an inner hollow pipe 27 which extends through the piston 26 to supply hydraulic fluid to the head end of the cylinder and an outer, larger and concentric pipe 28 which forms an annular passage 29 by which fluid is supplied through apertures 30 located near the piston 26 to the rod end of the cylinder. At its lower end, the slide 17 is formed with an integral, forwardly projecting bracket 31 carrying a broach pull head, generally designated 32. This pull head is more fully disclosed and described in my above mentioned application and is composed of a plurality of individual heads of the general character disclosed and claimed in the Lapointe Patent No. 2,027,486. Suffice it to say, therefore, that the head 32 is adapted releasably to receive one end of one or more broaching tools 34.

Likewise the hydraulic motor, generally designated 55, is of the reciprocatory type and comprises a cylinder 56 and a piston 57. This motor, as above stated, actuates the broach handling mechanism which includes an auxiliary slide 45 reciprocable in guideways formed in the end of the slide 17 opposite the bracket 31. This slide in turn carries a plurality of individual tool receiving heads 46 the construction of which is more particularly disclosed and claimed in my above mentioned application. Suffice it to say, therefore, that the heads 46 hold the tools inserted therein releasably so that at the appropriate time they may be withdrawn by the main slide 17 through the head 32. As here shown, the piston 57 forms the stationary element of the motor and to that end is through the medium of a double piston rod anchored to the upright column at the bottom thereof. An internal, hollow piston rod 58 extends through the piston 57 so as to supply fluid to the head end of the cylinder, while an outer, larger and concentric rod 59 forms an annular passage 60 for conducting fluid through port 61 to the rod end of the cylinder. The upper end of the cylinder 56 is connected by an adjustable rod 62 to the slide 45 of the broach handling mechanism. The motor 55 is disposed immediately in front of the main slide 17 and passes freely through a bore provided in the bracket 31 for that purpose. The slide 45 of the broach handling mechanism always remains above the table 21, while the head 32 always remains below the table 21.

The work supporting means, as above stated, includes an indexable work table 21 which is circular and is mounted for rotation on a stub shaft 67 journaled in the bed of the machine. Mounted on the table, disposed diametrically opposite one another, are two sets of work supports 70 which may be designed to accommodate the particular work blanks to be broached. The work supports are by suitable means, disclosed in my original application above mentioned, yieldably retained in work supporting position, but are tiltable by means later described to a position from which the work blanks will be discharged radially outwardly and downwardly.

In order that the motor 81 may serve to drive the table 21 in a manner such that the work blanks will be carried from a loading to a broaching position and thereafter to a discharge position, all in timed relation and coordinated with the movements of the main slide and of the broach handling mechanism, means is provided for indexing the table 21 through quarter revolutions. This means includes a Geneva mechanism comprising a disk 76 rigid with the bottom of the table 21 and provided with the usual four radial and 90° spaced grooves 77. Adapted to engage in the grooves 77 is a follower 78 carried by a quadrant 79 rigid on a shaft 80 journaled in the bed of the machine. The shaft 80 is driven from the rotary hydraulic motor 81 through a worm 82 on a shaft coupled to the motor shaft 83 and a worm wheel 84 fixed on the shaft 80. It is to be understood, of course, that the radius of the quadrant and of the disk 76, as well as the spacing of the shafts 67 and 80, is such that upon rotation of the quadrant 79 the follower 78 will enter one of the grooves 77 and operate therein to rotate the table through 90° and will thereafter leave the groove and, during the remainder of the revolution of the quadrant 79, return to initial starting position to enter the end of the groove 77 spaced 90° from the groove previously entered. In visualizing this operation and structure, it should be borne in mind that 79 is a quadrant with a radius approximately equal to that of grooves 77 and that, as shown in Fig. 1, it faces almost directly out of the sheet so that this radius is not apparent.

Means is also provided for positively locking the table 21 in its various positions. To that end, the disk 76 is provided with four sockets 85, while reciprocably mounted in the bed of the machine is a locking plunger 86 for cooperative engagement with the sockets 85. The plunger 86 is urged to locking engagement by a compression spring 87 and is disengaged from a socket 85 and held in disengaged position during the indexing of the table 21 through the medium of a cam follower 88, carried by the plunger, and an arcuate cam 89 carried on the underneath surface of the quadrant 79. The cam is of a length and so positioned relative to the follower 78 that the plunger is withdrawn prior to engagement of the follower 78 with a groove 77, and held withdrawn until the follower 78 has left the groove in the disk 76.

The finished work pieces herein are automatically discharged after the table has been indexed to its discharge position as an incident to the return movement of the main broaching slide. To that end there is journaled in the bed of the machine a shaft 93 extending from the rear toward the front of the machine. At its rear end this shaft has secured non-rotatably thereto a lever 94 (Fig. 1) carrying a follower 95 adapted to be engaged by a cam 96 carried by the main broach actuating slide 17. Extending coaxially with the shaft 93, but not shown herein, is a shaft connected to rock with the shaft 93. Non-rotatably mounted on this latter shaft is a lever 99 carrying a follower 100 at its free end and adapted when the shaft is rotated in the proper direction to tilt the work support 70 for the purpose of discharging the work blanks. Also non-rotatably fixed on the shaft 93 is a lever 101 which is engaged at its free end by a tension spring 102, the other end of which is anchored in the frame of the machine and which serves to urge the shaft 93, and hence the arm 89, to an inactive position.

Hydraulic circuit means is provided for supplying fluid to the various hydraulic motors at the times and in the quantities and directions necessary to bring about the desired operation of the broaching machine. This hydraulic circuit comprises a main pumping unit 110 composed of a variable delivery piston type main pump, a charging or make-up pump, and a hydraulically shifted fluid flow reversing means all housed in the same casing. Such a pumping unit is disclosed and claimed in the Gunnar A. Wahlmark U. S. Letters Patent No. 2,280,875, dated April 28, 1942. The pumping unit has a first port connected by a conduit 111 to the inner piston rod 27 of the hydraulic motor 24, a second port connected by a conduit 112 to the annular passage 29 formed by the outer piston rod 28, an intake port for the make-up pump connected by a conduit 113 to a reservoir or tank T to draw from the tank fluid to compensate for the difference in volume of opposite ends of the cylinder 25, and a discharge port connected to the tank T by a conduit 113'. This latter discharge port serves in well known manner to permit return to the tank of the excess fluid supplied by the make-up pump and the excess resulting from the difference in the volume of opposite ends of the cylinder 25.

The pumping unit 110 is adapted to be driven continuously in one direction by suitable motor means (not shown herein) and reversal of fluid discharge from the pumping unit is effected by shift of the fluid flow reversing means, while variation in displacement is effected by adjustment of the stroke of the piston under the control of a hydraulic motor 115. The motor 115 and the fluid flow reversing means are in turn controlled by a pair of pilot valves 116 and 117 which are spring urged to a normal position and are shifted to actuated position by the energization of solenoid coils MD and MU, respectively. The valves 116 and 117 are connected in a pilot circuit which includes a conduit 118 in which the valve 116 is interposed and a conduit 119 in which the valve 117 is interposed. These conduits connect at one end to the opposite ends of the reversing means and at the other end join to form a common conduit 120 leading to the pressure source as will presently become apparent. Connected at one end to one end of the governing motor 115 and joining at the other end with the conduit 118 intermediate the pumping unit and the valve 116, is a conduit 121, while a conduit 122 is similarly connected to the conduit 119 and to the opposite end of the motor 115 to supply fluid to one end or the other of the motor 115 in accordance with the shift of the valves 116 and 117. Exhaust fluid is returned to the tank through conduits 123 and 124. A suitable back pressure check valve 125 is interposed in the conduit 112 to permit free flow of the fluid when supplied to the rod end of the cylinder 25 for the purpose of effecting a return stroke, but which maintains the fluid discharged from the rod end of the cylinder under a predetermined back pressure to assure a uniform movement of the slide during a broaching stroke.

Fluid for actuating the motor 55 of the broach handling mechanism and the indexing motor 81 is supplied, respectively, by pumps PH and PI of a double pump unit 126 which also is continuously driven by the electric motor driving pump unit 110. The pump PH has an intake port connected with the tank T through a conduit 127 and a discharge port connected by a conduit 128 to a reversing valve 129. The reversing valve 129 is in turn connected by a conduit 130 to the inner piston rod 58 and by a conduit 131 to the annular passage 60 formed by the outer piston rod 59 of the motor 55. Relief valves 132 and 133, respectively, are connected to the conduits 130 and 131 to permit discharge to the tank under abnormal conditions, while also connected to the conduit 130 and communicating with the tank is a conduit 134 which includes a check valve 135 arranged to prevent flow to the tank but to permit fluid to be drawn into the head end of the cylinder 56 to make up the deficiency during the time that the slide 45 is raised by the main slide at a rate greater than the rate of fluid supply to the head end of the cylinder by the pump PH. A return conduit 136 leads from the valve to the tank T.

Shift of the reversing valve 129 is effected hydraulically under the control of pilot valves 137 and 138, respectively shiftable from normal position by energization of solenoid coils SD and SU. Energization of the SD coil and resultant shift of the valve 137 causes operating fluid to be supplied to the rod end of the cylinder 56 to effect a downward movement of the slide 45. Conversely, energization of the SU coil with its resultant shift of the valve 138 causes fluid to be supplied to the piston end of the cylinder 56 to effect a return movement of the slide 45. The operating fluid for effecting the shift of the reversing valve 129 is supplied to the pilot valves through branch conduits 139 and 140 into which the conduit 120 divides.

The circuit for the indexing motor 81 comprises an intake conduit 142 for the pump PI and a discharge conduit 143 leading from the pump to a start and stop valve 144. Leading from the valve 144 is a conduit 145 connected to the intake port of the motor 81 and a conduit 146 leading to the tank T. Fluid is exhausted from the motor 81 and returned to the tank through a conduit 147 which has interposed therein a back pressure check valve 148. The conduit 143 has interposed therein a back pressure valve 149 to maintain a predetermined pressure for the pilot circuit when the valve 144 permits discharge to the tank T, and has connected thereto a relief valve 150 permitting discharge to the tank under abnormal conditions.

Shift of the start and stop valve 144 is under the control of a pilot valve 151, similar to the valves 137 and 138, and is in turn governed by a solenoid coil I. Pilot fluid for governing the position of the valve 144 is supplied to the pilot valve 151 through a conduit 152 communicating with the conduit 143 in advance of the back pressure valve 149. A branch conduit 152' connects to the conduit 120 to supply fluid to the remainder of the pilot circuit. Energization of the solenoid coil I functions to shift the valve 144 in a direction to permit the pump PI to supply fluid to the indexing motor 81. The valves 137, 138 and 151 are, of course, provided with conduits leading to the tank T permitting the exhaust of fluid from the valves 129 and 144.

The various solenoid coils just mentioned are connected in an electrical control circuit see Fig. 2) which also includes a plurality of automatically actuated or manually actuated switches and relays functioning to energize the solenoid coils at proper times so as to effect automatic operation of the broaching machine once the same has been started by manual manipulation of a starting switch. The automatically actuated switches include limit switch devices 1LS, 2LS, 3LS, 4LS, 5LS, 6LS, 7LS, 8LS and 9LS (see Fig. 1). Each of these limit switch devices has a normal position to which it tends to return, a tripped position in which it remains only so long as physically held, and each is adapted to control one or more circuits and to that end is composed of one or more switches. Of these limit switch devices, 2LS, 3LS and 9LS are adapted to be tripped at various times by a dog D1 carried on the slide 45. The device 2LS has three switches 2LS—A, 2LS—B and 2LS—C (see Fig. 2) of which the 2LS—A and 2LS—B switches are normally open and the 2LS—C switch is normally closed. The 3LS device has but a single switch 3LS—A which is normally open, and likewise the 9LS device has but a single switch 9LS—A which is normally closed.

Switch devices 6LS, 7LS and 4LS are adapted to be actuated by dogs D2, D3 and D4, respectively, mounted on and carried by the main slide 17. Both the devices 6LS and 7LS have but a single switch 6LS—A and 7LS—A, respectively, the first of which is normally closed and the second normally open. The 4LS device has three switches 4LS—A, 4LS—B and 4LS—C, of which 4LS—A and 4LS—B are normally open and 4LS—C is normally closed. The 1LS device is governed by the table locking plunger 86 which for that purpose has depending therefrom a rod 155 which serves to trip the device when the plunger is withdrawn to free the table 21. The 1LS device has two switches, 1LS—A which is normally open, and 1LS—B which is normally closed. Also related in its control to the indexable work table 21 is the switch device 5LS having a single switch 5LS—A which is normally closed. This switch device is governed by an arm 156 which rotates with the shaft 80 of the worm wheel 84 and the quadrant 79. The remaining limit switch device 8LS also has but a single switch 8LS—A which is normally open. This device is controlled by the mechanism for effecting tilt of the work supporting plates 70 to work discharge position and is held tripped when the mechanism is in normal position. To effect such control over the switch device 8LS, there is pivotally connected to the arm 101 a depending rod 157 which terminates above the actuating arm of the switch device 8LS.

The electrical control also includes a plurality of relays 1R, 2R, 3R, 4R and 5R. Of these the relays 1R, 2R and 3R are latched relays each having two coils designated in the circuit diagram (Fig. 2) by the reference character applied to the relay plus and L and a U, respectively. Each relay has two positions to which it is shifted by temporary energization of the appropriate coil and in which it is held by mechanical detent means until the other coil is energized. The relay 1R has five switches 1R—A, 1R—B, 1R—C, 1R—X and 1R—Y. Upon energization of the coil 1R—U, switches 1R—A and 1R—Y are open while switches 1R—B, 1R—C and 1R—X are closed. The switches, of course, assume the opposite position after energization of the 1R—L coil. The relay 2R has seven switches 2R—A, 2R—B, 2R—C, 2R—D, 2R—E, 2R—X and 2R—Y. Of these, 2R—A, 2R—B, 2R—C and 2R—X are closed after energization of the coil 2R—U, while switches 2R—D, 2R—E and 2R—Y are open. Relay 3R is identical with relay 2R. In each of the relays the 2R—X switch is in series with the L coil, while the 2R—Y switch is in series with the U coil, and, as will be seen from the above. description, the 2R—X switch is opened upon energization of the L coils, while the 2R—Y switch is opened upon energization of the U coil. This is for the purpose of assuring temporary energization of the coils only, the latched character of the relays and particularly the cooperation of the detent means making this arrangement possible.

The relays 4R and 5R are not latched relays, but are ordinary relays having but a single coil, designated in Fig. 2 as 4R and 5R, respectively. The relay 4R has four switches 4R—A, 4R—B, 4R—D and 4R—E, which are all normally open when the relay is deenergized and which are closed upon energization of the relay coil 4R. Relay 5R has three switches 5R—A, 5R—B and 5R—C which also are open when the relay is in normal condition, namely, with the relay coil 5R deenergized, and which close upon energization of the coil 5R. It will become apparent as the description of the circuit and of the operation of the machine proceeds that the relays 1R and 5R govern the indexing of the table, that the relay 2R controls the pilot valves governing the direction of fluid flow to the motor of the broach handling mechanism, that the relay 3R controls the pilot valves governing the direction of fluid flow to the main slide motor, while relay 4R is a monitor or master relay.

The various solenoid and relay coils and the various limit and relay switches are connected in a control circuit shown diagrammatically in Fig. 2, which comprises a transformer Tr having a primary winding P connected to a high voltage source, and a secondary S having its ends connected to lead wires L1 and L2. Connected between the wires L1 and L2, in a plurality of minor or subcircuits, are the various switches and coils. A first such subcircuit Sc1 includes in series the relay coil 4R, a normally open, manually actuable starting switch M and a normally closed, manually actuable stop switch SS. Connected around the start switch M in a shunt circuit 160 is the switch 4R—A which forms a holding circuit for the relay coil 4R. Connected in series to form a second subcircuit Sc2 are the switches 8LS—A, 2LS—A, 1R—A, 4R—B and the coil 5R of the 5R relay. Connected about the switches 8LS—A, 2LS—A and 1R—A is a shunt circuit 161 including in series the switches 5LS—A and 5R—A. Connected about the switch 2LS—A is a shunt circuit 162 which includes the switch 4LS—A and connected about the switches 1R—A and 4R—B is a shunt circuit 163 which includes a normally open, manually actuable switch 164 adapted for inch indexing of the work supporting table. The solenoid coil I and the switches 5R—B and 5R—C are connected in series between the line wires L1 and L2 to form a subcircuit Sc3, and a fourth subcircuit Sc4 is formed by the series connection of the switches 1LS—A, 1R—Y and the 1R—U coil. A fifth subcircuit Sc5 includes in series connection the coil 1R—L and switches 1R—X and 7LS—A and includes a shunt circuit 165 connected around the switch 1R—X and the coil 1R—L having in series the switches 3R—A and 2R—X and the coil 2R—L. A sixth subcircuit Sc6 includes in series the switches 1LS—B, 2LS—B, 1R—B and 2R—Y and the coil 2R—U. Connected about the coil 2R—U and all the switches save 1LS—B is a shunt circuit 166 which includes in series the switches 4R—D and 4R—E. Connected between these last named switches in four parallel circuits are the solenoid coils SD, SU, MU and MD for the valves 137, 138, 117 and 116, respectively. In series with the coil SD are switches 9LS—A, 2R—B and 2R—C. In series with the coil SU are the switches 2LS—C, 2R—D and 2R—E. In series with the coil MU are the switches 6LS—A, 3R—B and 3R—C. In series with the coil MD are the switches 4LS—C, 3R—D and 3R—E. A seventh subcircuit Sc7 is formed by the series connection between the line wires L1 and L2 of the switches 9LS—A, 2R—A and 3R—X and the coil 3R—L, while an eighth and final subcircuit Sc8 includes in series connection the switches 4LS—B, 1R—C and 3R—Y and the coil 3R—U.

In order better to understand the sequence of movements or operations of the various motors, as well as the functions of the various switch devices, valves and so forth, the operation of the power transmission system will be described briefly in terms of the operation of the broaching machine. For that purpose, let it be assumed that the machine is idle in its normal starting position, that is, with the slide 45 of the broach handling mechanism and the main broach actuating slide both in their uppermost positions, and with the table 21 disposed with one work support in the broaching position, while the other work support is at the front of the machine where it can be loaded by the attendant. It is to be assumed further that unfinished work blanks are mounted in the work support which is in broaching position. Under these conditions the limit switch device 2LS will be tripped by the dog D1 on the slide 45, the device 6LS will be tripped by the dog D2 on the main slide, switch device 5LS will be tripped by the arm 156, and switch device 8LS will be tripped by the rod 157 of the work support tilting mechanism. The other switch devices will be in their normal position, relays 4R and 5R will be deenergized and all their switches open, all of the solenoid coils of the pilot valves will be deenergized, while the coils of the relays 1R, 2R and 3R will also be deenergized. In short, the switches will assume the positions shown in Fig. 2. To start operation, the attendant first starts the electric motor, which drives the pumps and then momentarily presses the start button M, thereby completing the subcircuit Sc1 to energize the 4R relay coil. Such energization of the coil 4R closes all of the switches of the 4R relay, among other things, to establish a holding circuit for the relay through the closure of the 4R—A switch and to complete the shunt circuit 166, through that branch which includes the coil SD in part governing operation of the slide 45, through the closure of the switches 4R—D and 4R—E. As a consequence, the slide 45 is started on its forward or, in this instance, downward stroke, since a circuit is now completed through the switches 1LS—B, 4R—D, 9LS—A, 2R—B, 2R—C and 4R—E to energize the coil SD of the valve 137. Such shift of the valve 137, due to energization of the coil SD, causes the reversing valve 129 to shift so that fluid is supplied to the rod end of the motor 55. With the initial forward movement of the slide 45, the switch device 2LS is permitted to return to normal position, as a result of which its switches 2LS—A and 2LS—B are opened, while its switch 2LS—C is closed partially to condition the circuit including the SU coil, the later energization of which will initiate the return movement of the slide 45.

The slide 45 continues to move downwardly alone and relative to the slide 17 carrying its broaches through the work pieces and into the pull head 32. At the time that the lower ends of the broaches are received in the pull head, the dog D1 temporarily trips the switch device 3LS, thereby temporarily closing its switch 3LS—A which is normally open. Closure of the switch 3LS—A completes the subcircuit Sc7 temporarily to energize the relay coil 3R—L. Such energization of the 3R—L coil shifts the relay to open its 3R—X switch deenergizing the 3R—L coil, closing its 3R—Y switch preparatory to a subsequent energization of the 3R—U coil, opening its 3R—A, 3R—B and 3R—C switches and, above all, closing its 3R—D and 3R—E switches. Closure of these latter switches completes a circuit energizing the coil MD of the pilot valve 116, which results in the pumping unit 110 supplying fluid to the head end of the cylinder 25 to initiate the broaching stroke of the main broach actuating slide. With the initial movement of the main broach actuating slide, the limit switch device 6LS is permitted to return to normal position resulting in a closure of its switch 6LS—A. Such closure, however, is ineffective to energize the coil MU because of the previous opening of the switches 3R—B and 3R—C.

The slide 45 and the main slide now continue downwardly in unison through the broaching stroke until the dog D1 trips the limit switch device 9LS, opening its switch 9LS—A and thereby deenergizing the coil SD. With such deenergization of the coil SD, the valve 137 is returned to normal position and the reversing valve 129 is returned to neutral position stopping movement of the slide 45. The main slide, however, continues downwardly to complete the broaching operation and to withdraw the broach from the broach handling heads of the slide 45 and through the work supports on the table 21. During the broaching stroke of the main slide, the dog D3 temporarily trips the switch device 7LS, temporarily to close its switch 7LS—A. Such closure of the switch 7LS—A completes the subcircuit Sc5 to energize the relay coil 1R—L, resulting in the opening of the relay switches 1R—B, 1R—C and 1R—X and closing of the switches 1R—A and 1R—Y. No immediate change takes place as a result, but the opening or closing of the certain switches serves to condition the circuits in which they are included for future operation, as will presently become apparent.

At the end of the broaching stroke of the main slide 17, dog D4 trips the limit switch device 4LS, thereby closing its switches 4LS—A and 4LS—B and opening its switch 4LS—C. Opening of the switch 4LS—C deenergizes the coil MD of the pilot valve 116, thereby to arrest the broaching stroke of the main slide. Closure of the switch 4LS—B accomplishes nothing because switch 1R—C is open. However, closure of switch 4LS—A completes a circuit to the relay coil 5R through the switches 8LS—A, 4LS—A, 1R—A and 4R—B which are now all closed. Energization of the coil 5R results in a closure of all of the relay switches 5R—A, 5R—B and 5R—C, the closure of 5R—B and 5R—C resulting in the completion of the subcircuit Sc3 to energize the coil I. With the energization of the I coil, the pilot valve 151 is shifted in turn to effect a shift of the valve 144, permitting flow of operating fluid to the indexing motor 81, resulting in commencement of the indexing operation.

With the initial rotation of the shaft 80 and the quadrant 79 non-rotatably fixed therewith, the arm 156 releases the switch device 5LS to permit its return to normal, resulting in a closure of its switch 5LS—A. Closure of this switch establishes a circuit for the coil 5R which is independent of the switch 1R—A which will presently be opened to place sole control over the indexing motor 81 in the switch device 5LS. Also, with the initial rotation of the shaft 80 and prior to entry of the follower 78 into a groove 77, the cam 89 on the quadrant 79 engages the cam follower 88 to withdraw the locking plunger 86 and at the same time through the rod 155 trip the switch device 1LS. Tripping of the switch device 1LS opens its switch 1LS—B, rendering the MU and MD coils incapable of energization and closes 1LS—A which completes the subcircuit Sc4 to energize the coil 1R—U. Energization of the 1R—U coil of the relay 1R opens the relay switches 1R—Y and 1R—A, opening of the latter placing the switch 5LS—A in full control of the indexing motor, as above stated. Energization of the 1R—U coil also results in a closure of switches 1R—X and 1R—B, which closure has no effect save to condition circuits for future use, and closure of switch 1R—C completes the subcircuit Sc8 energizing coil 3R—U of the relay 3R. Energization of the 3R—U coil in turn effects closure of the relay switches 3R—A, 3R—B, 3R—C and 3R—X. However, closure of switches 3R—B and 3R—C does not initiate upward movement of the main slide because 1LS—B is still open. The switches 3R—D, 3R—E and 3R—Y are also opened as a result of energization of 3R—U.

When the indexing of the table 21 is complete, that is, when it has been rotated through 90° so as to carry the work blanks from broaching position to an unloading position, the cam 89 disengages from the follower 88 permitting the plunger 86 to engage with a socket in the table 21 to lock the same and, incidental thereto, the switch device 1LS is returned to normal position. With such return to normal position, its switch 1LS—A is opened and its switch 1LS—B is closed. Opening of the switch 1LS—A has no effect, but closure of the switch 1LS—B results in completion of the circuit including the coil MU, which circuit had been previously conditioned by closure of the switches 3R—B and 3R—C. Return movement of the main slide is now initiated, since the energization of the coil MU causes the pumping unit 110 under the control of the pilot valve 117 to supply fluid to the rod end of the cylinder 25. Some time after the initiation of the return stroke of the main slide, the shaft 80 completes its revolution, causing the arm 156 to trip device 5LS, thereby opening switch 5LS—A and arresting operation of the indexing motor 81.

With the initial return movement of the main slide, the switch device 4LS is permitted to return to normal, resulting in the opening of its switches 4LS—A and 4LS—B, and closing of its switch 4LS—C. Nothing transpires immediately from this change, not even from the closure of 4LS—C, for the switches 3R—D and 3R—E are open. During the return movement of the main slide, the cam 96 carried thereon engages the follower 95 to rock shaft 93 and the lever 99 normally coupled thereto. Such rocking of the shaft 93 tilts the work support 70 which carries the finished work pieces causing the same to be discharged. At the same time, rocking of the shaft 93 withdraws the rod 157 to permit the switch device 8LS to open its switch 8LS—A which is its normal condition. The switch is, of course, again closed immediately upon return of the work support to its normal horizontal position.

During the return stroke, the main slide initially moves alone and relative to the broach handling slide 45 until the upper ends of the broaches are restored to the heads in the slide 45, which takes place about the same time that the key K on the main slide engages key K' on the slide 45. Prior to such engagement of the key K with the slide 45, the dog D3 momentarily trips the switch device 7LS, temporarily closing its switch 7LS—A. Such temporary closure of the switch 7LS—A completes circuits energizing both the 1R—L and the 2R—L coils Energization of the 1R—L coil of the relay 1R causes its switches 1R—B, 1R—C and 1R—X to be opened and its switches 1R—A and 1R—Y to be closed, but no immediate change is effected. Energization of 2R—L opens the relay switches 2R—A, 2R—B, 2R—C and 2R—X and closes the relay switches 2R—D, 2R—E and 2R—Y. Closure of the switches 2R—D and 2R—E completes a circuit to the coil SU of the pilot valve 138, thereby effecting a shift in the reversing valve 129 in such direction that fluid is supplied to the head end of the cylinder 56. The broach handling slide 45 and the main slide now move through their return stroke in unison.

With the initial return movement of the slide 45, the switch device 9LS is, of course, released and permitted to return to normal, resulting in a closure of its switch 9LS—A. Closure of this switch, however, does not energize the coil SD since the switches 2R—B and 2R—C have previously been opened as a result of the energization of the 2R—L coil. During the return movement of the slide 45, the dog D1 also temporarily trips the switch device 3LS, but, like the switch 9LS, is ineffective because the switch 2R—A is open at such time. The two slides continue in unison until the dog D2 trips the switch device 6LS, effecting an opening of the switch 6LS—A. Because of the opening of the switch 6LS—A, the circuit to the coil MU is broken and, with the deenergization of the coil, the pumping unit 110 discontinues supplying operating fluid whereby the main slide comes to rest in its uppermost normal starting position. The slide 45 now continues in its return movement independently of the main slide and until its dog D1 trips the switch device 2LS.

With the tripping of the device 2LS, its switch 2LS—C is opened to deenergize the coil SU, resulting in a return of the reversing valve 129 to neutral position and cessation of flow of fluid to the motor 55 of the broach handling mechanism bringing the slide 45 to a stop in its uppermost normal starting position. Tripping of the device 2LS closes its switches 2LS—B and 2LS—A, closure of the latter serving to complete a circuit energizing the coil 5R. This results in closure of all of the 5R relay switches, namely 5R—A, 5R—B and 5R—C to again partially establish a holding circuit for the relay 5R and to complete the subcircuit Sc3 to energize the coil I. With the energization of the coil I, the indexing motor 81 is started, as previously described, and with the initial operation of the motor the switch device 5LS is permitted to return to normal, while the switch device 1LS is tripped. Return of the switch device 5LS to normal closes its switch 5LS—A to complete the holding circuit for the relay coil 5R. Tripping of the switch device 1LS opens 1LS—B again to render all of the solenoid coils on the pilot valves incapable of energization and closes 1LS—A to energize 1R—U. Energization of 1R—U opens 1R—A to place 5R under the sole control of the switch 5LS and closes 1R—B and 1R—C to condition circuit to 2R—U. With the completion of the indexing of the table, that is, the rotation of the same through 90° which has now again placed one of the work supports in the broaching position, while the other is at the front of the machine ready to be loaded by the attendant, the table is locked and the switch device 1LS returned to normal. Such return to normal opens its switch 1LS—A and closes its switch 1LS—B to complete the subcircuit Sc6 and energize the coil 2R—U. Such energization of the coil opens the relay switches 2R—D and 2R—E and closes the relay switches 2R—A, 2R—B and 2R—C. Closure of the latter two completes the circuit to the coil SD of the pilot valve 137, initiating a new cycle of operation of the broaching machine.

I claim as my invention:

1. In a hydraulic power transmission system, the combination of a main fluid motor, an auxiliary fluid motor, said motors being movable through forward and reverse strokes in the same direction, a first hydraulic circuit including said main motor and a pump means forming a source of fluid under pressure for operating said main motor, a second hydraulic circuit independent of said first circuit including said auxiliary motor and a pump for supplying fluid thereto at a constant rate, a reservoir for the fluid, means for controlling the supply of fluid to said motors, means forming a separable mechanical connection between said main and auxiliary motors, governing means for operating the control means to cause said main and auxiliary motors to move through a cycle of non-simultaneous but partially concurrent forward and reverse strokes, the main motor driving the auxiliary motor by said mechanical connection during the concurrent portion of said reverse stroke at a rate in excess of that at which it is driven by fluid supplied thereto, a conduit connecting the reservoir and the side of said second circuit constituting the supply side during the reverse stroke of said auxiliary motor, and check valve means in said conduit permitting fluid to be drawn into said auxiliary motor directly from said reservoir.

2. In a hydraulic power transmission system, the combination of a main fluid motor, an auxiliary fluid motor, said motors being movable through forward and reverse strokes in the same direction, pump means forming a source of fluid under pressure for operating said motors, a reservoir for the fluid, means for controlling the supply of fluid to said motors, means forming a separable mechanical connection between said main and auxiliary motors, governing means for operating the control means to cause said main and auxiliary motors to move through a cycle of non-simultaneous but partially concurrent forward and reverse strokes, the main motor driving the auxiliary motor by said mechanical connection during the concurrent portion of said reverse stroke, and check valve means permitting flow directly from the reservoir to said auxiliary motor during the concurrent portion of the reverse stroke of said main and auxiliary motors.

3. In a hydraulic power transmission system, the combination of a main fluid motor, an auxiliary fluid motor, said motors being movable through forward and reverse strokes in the same direction, pump means forming a source of fluid under pressure for operating said motors, hydraulically actuated means controlling the supply of fluid to said motors, means forming a separable mechanical connection between said main and auxiliary motors, and governing means for said hydraulically actuated control means including a fluid control circuit operating said control means to cause said main and auxiliary motors to move through a cycle of non-simultaneous but partially concurrent forward and reverse strokes, the main motor operating the auxiliary motor by said mechanical connection during the concurrent portion of said reverse strokes.

4. In a hydraulic power transmission system, the combination of a main fluid motor, an auxiliary fluid motor, said motors being movable through forward and reverse strokes in the same direction, a first and a second pump means forming a source of fluid under pressure for operating said main and said auxiliary motors respectively, a hydraulically actuated fluid flow reversing means determining the direction of fluid flow between said first pump means and said main motor, a hydraulically actuated fluid flow reversing means determining the direction of fluid flow between said second pump means and said auxiliary motor, means forming a separable mechanical connection between said main and said auxiliary motors, and governing means for said reversing means including a fluid control circuit and a pair of electrically operated valves for each reversing means governing the supply of control fluid to said reversing means.

5. In a hydraulic power transmission system, the combination of a main fluid motor, an auxiliary fluid motor, said motors being movable through forward and reverse strokes in the same direction, a first hydraulic circuit including said main motor and a pump means forming a source of fluid under pressure for operating said main motor, a hydraulically actuated fluid flow reversing means determining the direction of fluid flow between the pump and said main motor, a second hydraulic circuit independent of said first circuit including said auxiliary motor, a pump means forming a source of fluid under pressure for operating said auxiliary motor and a hydraulically actuated fluid flow reversing means interposed between the pump and motor, means forming a separable mechanical connection between said main and auxiliary motors, and governing means including a third hydraulic circuit, constituting a control circuit for said fluid flow reversing means, governing said valves to cause said main and auxiliary motors to move through a cycle of forward and reverse strokes with a portion of the strokes in each direction being concurrent and with said motors connected through said separable mechanical connection.

6. In a hydraulic power transmission system, the combination of a main fluid motor, an auxiliary fluid motor, said motors being movable through forward and reverse strokes in the same direction, a first hydraulic circuit including said main motor and a pump means forming a source of fluid under pressure for operating said main motor, a hydraulically actuated fluid flow reversing means determining the direction of fluid flow between the pump and said main motor, a second hydraulic circuit independent of said first circuit including said auxiliary motor, a pump means forming a source of fluid under pressure for operating said auxiliary motor and a hydraulically actuated fluid flow reversing means interposed between the pump and motor, means forming a separable mechanical connection between said main and auxiliary motors, and governing means including a third hydraulic circuit, constituting a control circuit for said reversing means, electrically actuated valves controlling the fluid in said third circuit, and an electrical circuit controlling said electrical valves to cause said main and auxiliary motors to move through a cycle of forward and reverse strokes with a portion of the strokes in each direction being concurrent and with said motors connected through said separable mechanical connection.

7. In a hydraulic power transmission system, the combination of a main fluid motor, an auxiliary fluid motor, said motors being movable through forward and reverse strokes in the same direction, a third motor, a first hydraulic circuit including said main motor and a pump means forming a source of fluid under pressure for operating said main motor, a hydraulically actuated fluid flow reversing means determining the direction of fluid flow between the pump and said main motor, a second hydraulic circuit independent of said first circuit including said auxiliary motor, a pump means forming a source of fluid under pressure for operating said auxiliary motor and a hydraulically actuated reversing valve interposed between the pump and motor, means forming a separable mechanical connection between said main and auxiliary motors, a third hydraulic circuit including said third motor, a pump means forming a source of fluid under pressure and a hydraulically actuated start and stop valve, and governing means, including a fourth hydraulic circuit supplied with fluid from the pump of said third circuit and constituting a control circuit for said valves and said reversing means, for determining the operation of said motors.

8. In a hydraulic power transmission system, the combination of a main fluid motor, an auxiliary fluid motor, said motors being movable through forward and reverse strokes in the same direction, a third motor, a first hydraulic circuit including said main motor and a pump means forming a source of fluid under pressure for operating said main motor, a hydraulically actuated fluid flow reversing means determining the direction of fluid flow between the pump and said main motor, a second hydraulic circuit independent of said first circuit including said auxiliary motor, a pump means forming a source of fluid under pressure for operating said auxiliary motor and a hydraulically actuated reversing valve interposed between the pump and motor, means forming a separable mechanical connection between said main and auxiliary motors, a third hydraulic circuit including said third motor, a pump means forming a source of fluid under pressure, a hydraulically actuated start and stop valve and a back pressure valve interposed between the start and stop valve and the pump of said third circuit, and governing means for said valves and said reversing means including a fourth hydraulic circuit connected to said third circuit intermediate the pump and the back pressure valve.

9. In a hydraulic power transmission system, the combination of a main fluid motor, an auxiliary fluid motor, said motors being movable through forward and reverse strokes in the same direction, a third motor, a first hydraulic circuit including said main motor and a pump means forming a source of fluid under pressure for operating said main motor, a hydraulically actuated fluid flow reversing means determining the direction of fluid flow between the pump and said main motor, a second hydraulic circuit independent of said first circuit including said auxiliary motor, a pump means forming a source of fluid under pressure for operating said auxiliary motor and a hydraulically actuated reversing valve interposed between the pump and motor, means forming a separable mechanical connection between said main and auxiliary motors, a third hydraulic circuit including said third motor, a pump means forming a source of fluid under pressure, a hydraulically actuated start and stop valve and a back pressure valve interposed between the start and stop valve and the pump of said third circuit, and governing means for said valves and said reversing means including a fourth hydraulic circuit connected to said third circuit intermediate the pump and the back pressure valve, electrically actuated valves in said fourth circuit governing the supply of control fluid to said reversing and start and stop valves and said reversing means, and an electrical control circuit for said electrical valves.

10. In a hydraulic power transmission system, the combination of a main fluid motor, an auxiliary fluid motor, said motors being movable through forward and reverse strokes in the same direction, a third fluid motor, pump means forming a source of fluid under pressure for operating said motors, means for controlling the supply of fluid to said motors, means forming a separable mechanical connection between said main and auxiliary motors, and governing means for operating the control means to cause said main and auxiliary motors to move through a cycle of non-simultaneous but partially concurrent forward and reverse strokes with the main motor operating the auxiliary motor by said mechanical connection during the concurrent portion of said reverse strokes, and to retain the main and auxiliary motors at rest during reversal of strokes while the third motor moves through a cycle.

11. In a hydraulic power transmission system, the combination of a main fluid motor, an auxiliary fluid motor, said motors being movable through forward and reverse strokes in the same direction, a third fluid motor, pump means forming a source of fluid under pressure for operating said motors, means for controlling the supply of fluid to said motors, means forming a separable mechanical connection between said main and auxiliary motors, and governing means for operating the control means to cause said main and auxiliary motors to move through a non-simultaneous but partially concurrent forward stroke with the third fluid motor initiated and operated through a cycle upon the culmination of the forward stroke of said main and auxiliary motors and while said main and auxiliary motors are at rest; said main and auxiliary motors to move through a non-simultaneous but partially concurrent reverse stroke upon culmination of the cycle of said third motor with the third motor again operating through a cycle upon culmination of the reverse strokes of said main and auxiliary motors, the main motor operating the auxiliary motor by said mechanical connection during the concurrent portion of said reverse stroke.

12. In a hydraulic power transmission system, the combination of a main fluid motor, an auxiliary fluid motor, said motors being movable through forward and reverse strokes in the same direction, a third fluid motor, a first, a second and a third pump means forming a source of fluid under pressure for operating said main, said auxiliary, and said third motors respectively, means for controlling the supply of fluid to said motors including fluid flow reversing means for governing the supply of fluid to each said main and said auxiliary motors, and a start and stop valve means for governing the supply of fluid to said third motor, means forming a separable mechanical connection between said main and auxiliary motors, and governing means for operating the control means to cause said main and auxiliary motors to move through a cycle of non-simultaneous but concurrent forward and reverse strokes, the main motor operating the auxiliary motor by said mechanical connection during the concurrent portion of said reverse stroke, and with the main and auxiliary motors at rest during reversal while the third motor moves through a cycle.

13. In a hydraulic power transmission system, the combination of a main fluid motor, an auxiliary fluid motor, said motors being movable through forward and reverse strokes in the same direction, a third fluid motor, a first, a second and a third pump means forming a source of fluid under pressure for operating said main, said auxiliary, and said third motors respectively, means for controlling the supply of fluid to said motors including hydraulically actuated fluid flow reversing means for governing the supply of fluid to each said main and said auxiliary motors, and a hydraulically actuated start and stop valve means for governing the supply of fluid to said third motor, means forming a separable mechanical connection between said main and auxiliary motors, and governing means for operating the control means including a control circuit and electrically operated valve means in the control circuit governing the supply of control fluid to the valve and reversing means of said control means.

14. In a hydraulic power transmission system, the combination of a main fluid motor, an auxiliary fluid motor, a work support indexing fluid motor, pump means forming a source of fluid under pressure for operating said motors, means for controlling the supply of fluid to said motors including a hydraulically actuated fluid flow reversing means for each said main and said auxiliary motors, a pair of solenoid actuated valves for each of said reversing means and an electrical system including the solenoids of said solenoid actuated valves connected in parallel, and a switch device connected in series with said solenoids and opened by means driven by said indexing motor during the indexing operation thereof to prevent operation of either said main or said auxiliary motors.

15. In a hydraulic power transmission system, the combination of a main fluid motor, an auxiliary fluid motor, a work support indexing fluid motor, pump means forming a source of fluid under pressure for operating said motors, means for controlling the supply of fluid to said motors including a hydraulically actuated fluid flow reversing means for each said main and said auxiliary motors, and a hydraulically actuated start and stop valve for said indexing motor, a control fluid circuit including a pair of solenoid valves for each of said reversing means governing the supply of control fluid thereto and a single solenoid valve governing the supply of control fluid to said start and stop valve, and an electrical circuit for governing said solenoid valves to determine the operation of said motors including the solenoids of the solenoid valves, a pair of relays exercising control over said indexing motor, a first switch device actuated by means driven by said main motor at the end of operation thereof in a forward stroke to initiate operation of said indexing motor, and a second switch device actuated by means driven by said indexing motor operable after initiation of said indexing motor to establish a running circuit for said indexing motor independently of said first switch device.

JOHN W. PODESTA.